United States Patent
Zhao et al.

(10) Patent No.: US 9,724,578 B2
(45) Date of Patent: Aug. 8, 2017

(54) MOTION SENSOR IN A SPORTS INSTRUMENT

(71) Applicant: Zepp Labs, Inc., Los Gatos, CA (US)

(72) Inventors: Ke Zhao, Beijing (CN); Zheng Han, Beijing (CN)

(73) Assignee: Zepp Labs, Inc., Los Gatos, CA (US)

( * ) Notice: Subject to any disclaimer, the term of this patent is extended or adjusted under 35 U.S.C. 154(b) by 0 days.

(21) Appl. No.: 15/195,756

(22) Filed: Jun. 28, 2016

(65) Prior Publication Data

US 2017/0001070 A1 Jan. 5, 2017

Related U.S. Application Data

(60) Provisional application No. 62/186,922, filed on Jun. 30, 2015.

(51) Int. Cl.
*A63B 49/08* (2015.01)
*A63B 59/00* (2015.01)
(Continued)

(52) U.S. Cl.
CPC .............. *A63B 59/00* (2013.01); *A63B 51/00* (2013.01); *A63B 57/00* (2013.01); *A63B 60/00* (2015.10); *G06K 9/00342* (2013.01); *H04M 1/725* (2013.01); *A63B 71/0622* (2013.01); *A63B 2071/0658* (2013.01); *A63B 2102/02* (2015.10); *A63B 2102/04* (2015.10); *A63B 2102/18* (2015.10); *A63B 2102/32* (2015.10); *A63B 2209/08* (2013.01); *A63B 2220/16* (2013.01);
(Continued)

(58) Field of Classification Search
USPC ................ 473/131, 221, 222, 223, 549, 409
See application file for complete search history.

(56) References Cited

U.S. PATENT DOCUMENTS

| 5,226,650 A | 7/1993 | Suttner |
| 8,992,346 B1 * | 3/2015 | Raposo .................. A63B 57/00 473/131 |

(Continued)

FOREIGN PATENT DOCUMENTS

| CN | 101965214 A | 2/2011 |
| CN | 203944096 U | 11/2014 |

OTHER PUBLICATIONS

PCT International Search Report and Written Opinion for PCT/US2016/039895, Sep. 27, 2016, 10 pages.

*Primary Examiner* — Nini Legesse
(74) *Attorney, Agent, or Firm* — Fenwick & West LLP (57) ABSTRACT

A solution is provided to enhance motion detection and recognition of moving objects associated with various sports by embedding motion sensors into sports instruments such as tennis rackets, badminton rackets, baseball bats and golf clubs, that are swung in a three-dimensional (3D) space. A motion sensor device inserted and locked inside a sports instrument is configured to detect motions associated with movements associated with the sports instrument. The device is shaped to be inserted into a sensor housing attached to a selected location inside the sports instrument. The device includes a motion sensor for detecting motion associated with the movement of the sports instrument, a cover for protecting the motion sensor, and a locking mechanism attached to the sensor housing for locking the motion sensor inside the sensor housing.

14 Claims, 11 Drawing Sheets

(51) Int. Cl.
*A63B 51/00* (2015.01)
*A63B 57/00* (2015.01)
*A63B 60/00* (2015.01)
*G06K 9/00* (2006.01)
*H04M 1/725* (2006.01)
A63B 102/02 (2015.01)
A63B 102/04 (2015.01)
A63B 102/18 (2015.01)
A63B 102/32 (2015.01)
A63B 71/06 (2006.01)

(52) U.S. Cl.
CPC ... *A63B 2220/803* (2013.01); *A63B 2220/833* (2013.01); *A63B 2225/20* (2013.01); *A63B 2225/50* (2013.01); *H04M 2250/12* (2013.01)

(56) References Cited

U.S. PATENT DOCUMENTS

| | | | | |
|---|---|---|---|---|
| 2005/0261073 A1* | 11/2005 | Farrington, Jr. | ... | A63B 69/3632 473/221 |
| 2006/0166738 A1* | 7/2006 | Eyestone | ............. | A63B 15/005 463/36 |
| 2009/0233735 A1* | 9/2009 | Savarese | ................. | G01S 19/19 473/407 |
| 2012/0244969 A1* | 9/2012 | Binder | ................... | A63H 33/18 473/570 |
| 2012/0277017 A1* | 11/2012 | Boyd | ................. | A63B 24/0003 473/223 |
| 2013/0065703 A1* | 3/2013 | Rose | ................. | A63B 69/3632 473/223 |
| 2013/0267338 A1 | 10/2013 | Boyd et al. | | |
| 2014/0200093 A1* | 7/2014 | Parke | ...................... | G01P 1/023 473/223 |

* cited by examiner

MOTION SENSOR IN A SPORTS INSTRUMENT

CROSS REFERENCE TO RELATED APPLICATIONS

This application claims the benefit of U.S. Provisional Application No. 62/186,922, filed Jun. 30, 2015, which is incorporated by reference in its entirety.

BACKGROUND

This invention relates generally to motion recognition and particularly to embedding a motion sensor with a sports instrument for motion tracking and recognition.

Motion detection and recognition of a moving object, such as a golf swing, are widely used to enhance athletes' performance. The techniques for path and stance recognition for spatial accelerated motion can be used in combination with human body movements for detection of human body actions in the field of sports. Path and stance recognition for a spatial accelerated motion refers to detecting position and intersection angles of a moving object (e.g., a golf club swung by a player) at each time in the movement and obtaining real-time velocity of the mobbing object. Taking golf as an example, golf is a sport that often requires good control of motions, and an accurate analysis of the golf swing motions detected by a motion sensor can enhance golf players' performance.

To detect motion of a moving object, a motion sensor is often used to collect motion parameters associated with the moving object such as information of acceleration, velocity and position of the moving object. Some existing solutions for motion detection and recognition attach a motion sensor to the surface part of a sports instrument (e.g., rear end of a golf club, or golf gloves) used by players. However, attaching a motion sensor to the surface part of a sports instrument faces many challenges for accurate motion detection, such as making the motion sensor vulnerable for damages, affecting the holding of the sports instrument due to the attachment of the motion sensor and lack of accuracy of motion detection.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A solution is provided to enhance motion detection and recognition of moving objects associated with various sports by intelligently embedding motion sensor devices into sports instruments such as tennis rackets, badminton rackets, baseball bats and golf clubs, that are swung in a three-dimensional (3D) space. The motion sensor devices embedded inside the sports instruments are securely locked and preferably are detachable for replacement. The shapes and sizes of motions sensors are adjustable for different types of sports instruments in a variety of shapes. The insertion and locking of a motion sensor device in a sports instrument does not adversely affect a player's hold of the instrument.

A motion sensor device inserted and locked inside a sports instrument is configured to detect motions associated with movements associated with the sports instrument. The motion parameters associated with the detected motion are collected through the embedded motion sensor and analyzed by a motion detection and recognition system. Examples of the embodiments of these motion sensors and the motion detection and recognition system include some described in U.S. Patent Publication No. 2012/0277890 A1 and U.S. Pat. No. 8,725,452 B2, each of which is incorporated by reference herein in its entirety. Based on the analysis of the motion parameters, various types of sports performance reports and performance improvement recommendations are generated for users of the sports instruments.

Figure 1A:
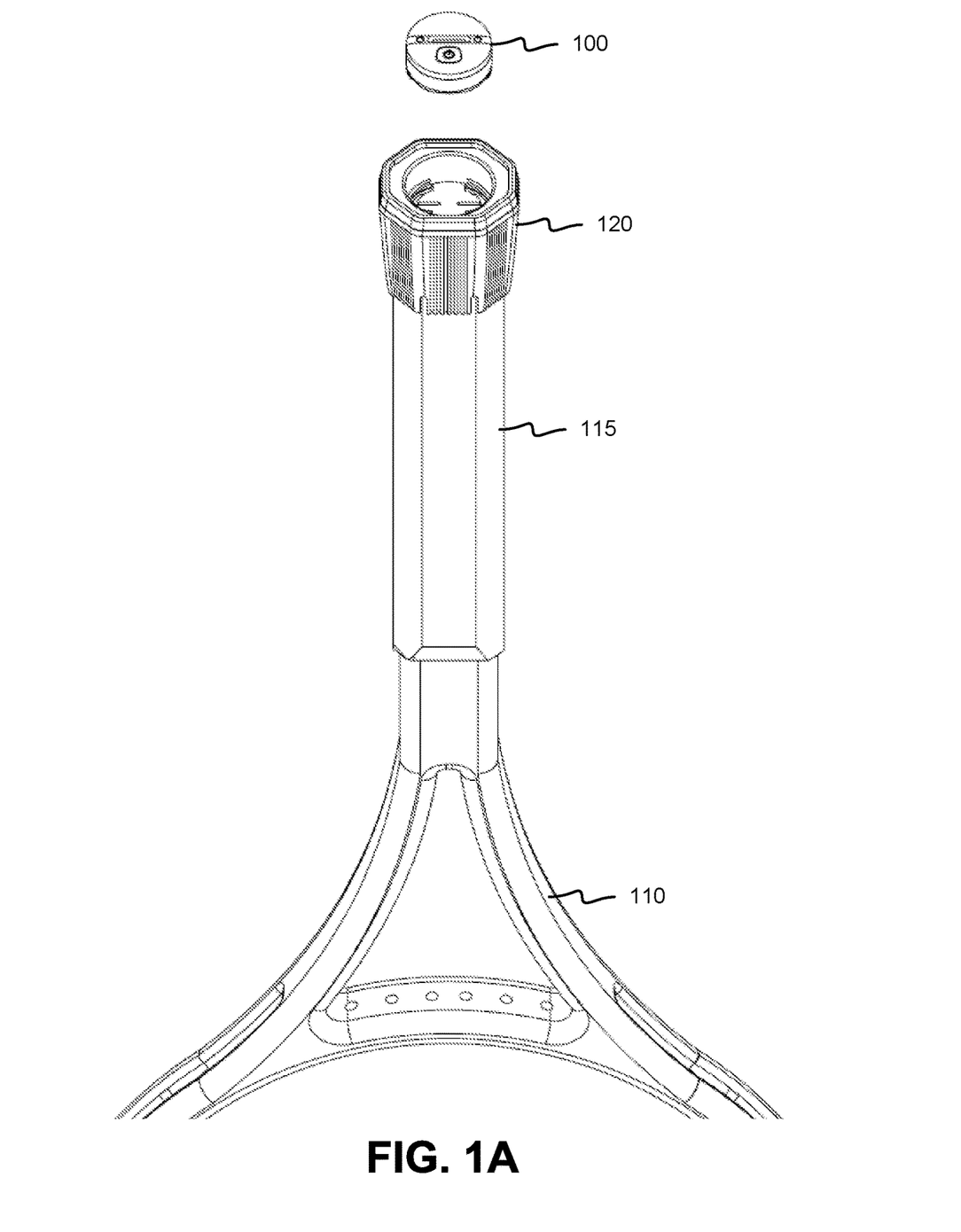
FIG. 1A illustrates a motion sensor device for insertion into a sports instrument and a sports instrument having a slot for housing the motion sensor, according to one embodiment.

FIG. 1A illustrates a motion sensor device for insertion into a sports instrument and a sports instrument having a slot for housing the motion sensor device, according to one embodiment. The sports instrument 110 illustrated in FIG. 1A is a tennis racket for illustration purpose, but other sports instruments may be used as well. The sports instrument 110 includes a handle 115 for a user to hold the sports instrument 110. The handle 115 of the sports instrument includes a housing 120 for housing a motion sensor device 100. In some embodiments, the motion sensor device 100 is detachable from the housing 120. Additionally, the housing 120 may also be detachable from the handle 115 of the sports instrument 110. In this embodiment, the housing 120 may have a first opening for inserting the motion sensor device 100 into, and a second opening attaching the housing 120 to the handle 115 of the sports instrument 110.

Figure 1B:
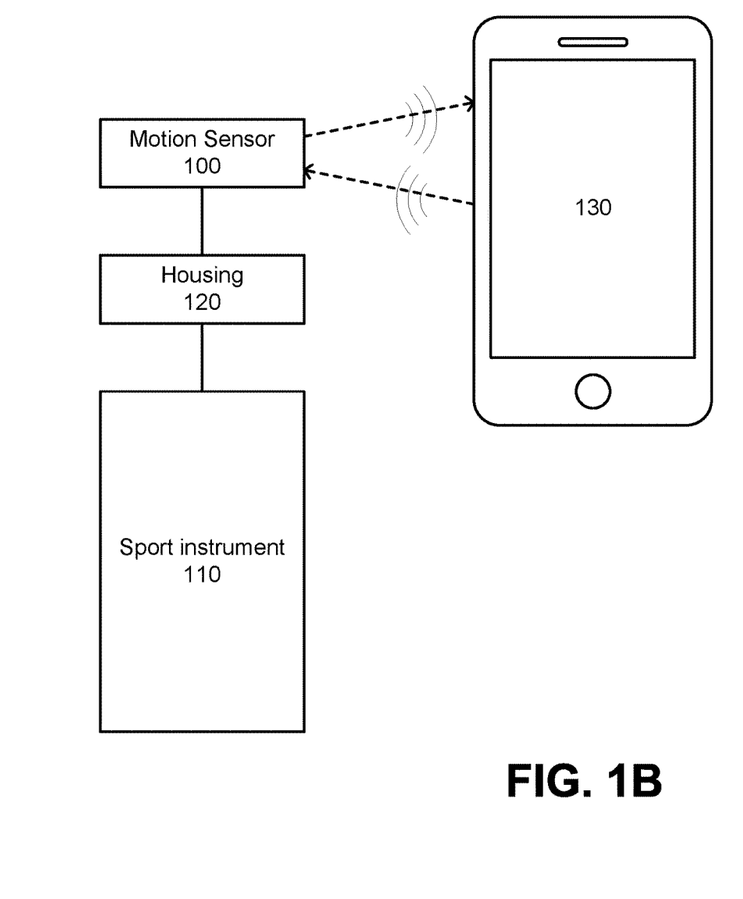
FIG. 1B illustrates an application of intelligently inserting a motion sensor into a sports instrument, according to one embodiment

FIG. 1B illustrates an application of intelligently inserting a motion sensor device into a sports instrument, according to one embodiment. The motion sensor device 100 that is inserted into the sports instrument 110 via a housing 120 wirelessly connects to a client device 130. In some embodiments, the client device 130 is a mobile device, such as a smartphone. In some embodiments, the motion sensor device 100 sends recorded motion data of a player using the sports instrument 110 to the client device 130 in real time. In other embodiments, the motion sensor device 100 stores the recorded data in an internal memory, and sends the stored data at a later time. The client device 130 may then be used to view the recorded data. In some embodiments, the client device 130 further analyzes the motion data received from the motion sensor device 100 and displays the analyzed data to the user of the mobile device 130. For instance, the client device 130 may present suggestions to the user on how to improve the usage of the sports instrument 110.

Figure 2A:
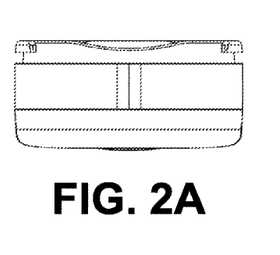
FIG. 2A illustrates a front view of a motion sensor device for insertion into a sports instrument, according to one embodiment.
Figure 2B:
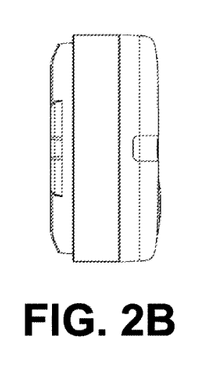
FIG. 2B illustrates a first side view of the motion sensor device for insertion into a sports instrument, according to one embodiment.
Figure 2C:
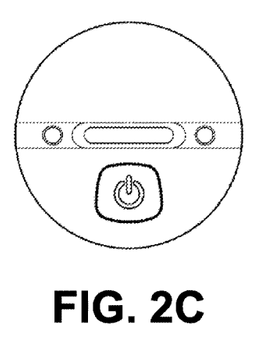
FIG. 2C illustrates a top view of the motion sensor device for insertion into a sports instrument, according to one embodiment.
Figure 2D:
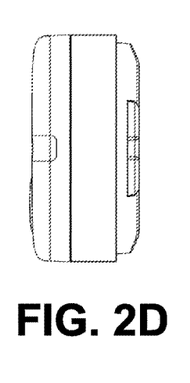
FIG. 2D illustrates a second side view of the motion sensor device for insertion into a sports instrument, according to one embodiment.
Figure 2E:
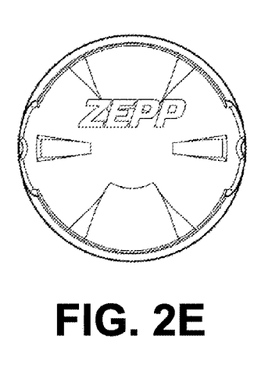
FIG. 2E illustrates a bottom view of the motion sensor device for insertion into a sports instrument, according to one embodiment.
Figure 2F:
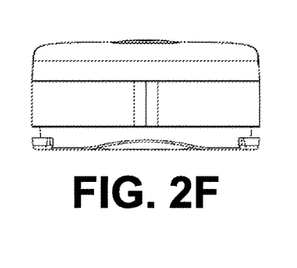
FIG. 2F illustrates a back view of the motion sensor device for insertion into a sports instrument, according to one embodiment.

FIGS. 2A-2F illustrate multiple views of the motion sensor device 100, according to one embodiment. In particular, FIG. 2A is a front view of the motion sensor device 100, FIG. 2B is a first side view of the motion sensor device 100, FIG. 2C is a top view of the motion sensor device 100, FIG. 2D is a second side view of the motion sensor device 100, FIG. 2E is a bottom view of the motion sensor device 100, and FIG. 2F is a back view of the motion sensor device 100. In the embodiment shown in FIGS. 2A-2F, the motion sensor device 100 has a round shape. In other embodiments, the motion sensor device 100 may have other shapes. In the embodiment show in FIGS. 2A-2F, the motion sensor device 100 has a diameter of approximately 25.4 mm and a thickness of approximately 12.3 mm. The selected location to insert the motions sensor device 100 is the bottom of a tennis racket or a baseball bat (or other sports instrument) because this part of the instrument is rarely touched by a player during the play. Thus, inserting the motion sensor device 100 at the selected location can reduce the interference with the play of the sports instrument 110. Additionally, the bottom part of a tennis racket or baseball bat tends to be hollow, which provides the space to house the motion sensor device 100. The size of the motion sensor device 100 shown in FIGS. 2A-2F can be adjusted so that it can be inserted into many sports instruments 110 of different sizes and shapes. For children's sports instruments, the size of the motion sensor device 100 may be reduced to consider the limit for children's sports instruments and provide motion sensor devices in smaller dimensions while maintaining the functionalities provided by the motion sensor devices.

Figure 3:
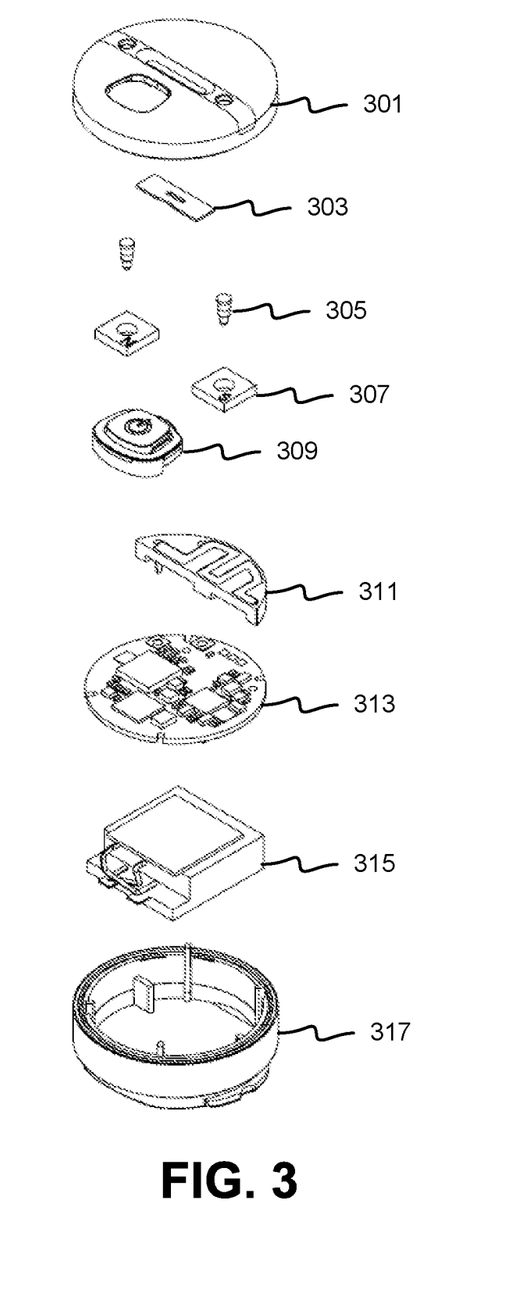
FIG. 3 illustrates an exploded view of a motion sensor device to be inserted into a sports instrument, according to one embodiment.

FIG. 3 is an exploded view of a motion sensor device to be inserted into a sports instrument. The motion sensor device includes the following components, from top to bottom. The top cover 301 provides protection for the rest of the motion sensor device. The light shielding plate 303 provides protection to light-emitting diodes (LEDs) on a printed circuit board (PCB) while allowing the user to see the light produced by the LEDs. The LEDs emitting different colored lights can be used to indicate different status of the motion sensor device to the user.

The charging pins 305 fit into holes in the top cover 301 and provide electrical contact from an external charger (see FIG. 7) to the battery via the PCB board. The magnets 307 are used to automatically align the external charger to the charging pins 305. For instance, the charger of the motion sensor device may also include magnets. In this example, the magnets of the motion sensor device would attract the magnets of the charger when the charging pins of the charger are correctly aligned to the charging pins 305 of the motion sensor device. Alternatively, the magnets of the motion sensor device may repel the magnets of the charger when the charging pins are incorrectly aligned to the charging pins 305 of the motion sensor device. In an alternate design, the motion sensor device may be wirelessly charged.

The button 309 fits into a hole in the top cover 301 and provides a user interface for the player of the sports instrument having the motion sensor device inserted. The antenna 311 supports wireless communication between the motion sensor device and other devices, such as a smart phone 130 as shown in FIG. 1B. The PCB board 313 contains the electronics and motion sensors. For instance, the motion sensors may be included in one or more chips that are solder onto the PCB board 313. Other embodiments of the motion sensor device can have two or more PCBs. The rechargeable battery 315 provides electrical power to the motion sensor device inserted into the sports instrument. The bottom shell 317 is part of the exterior of the motion sensor device.

Figure 4:
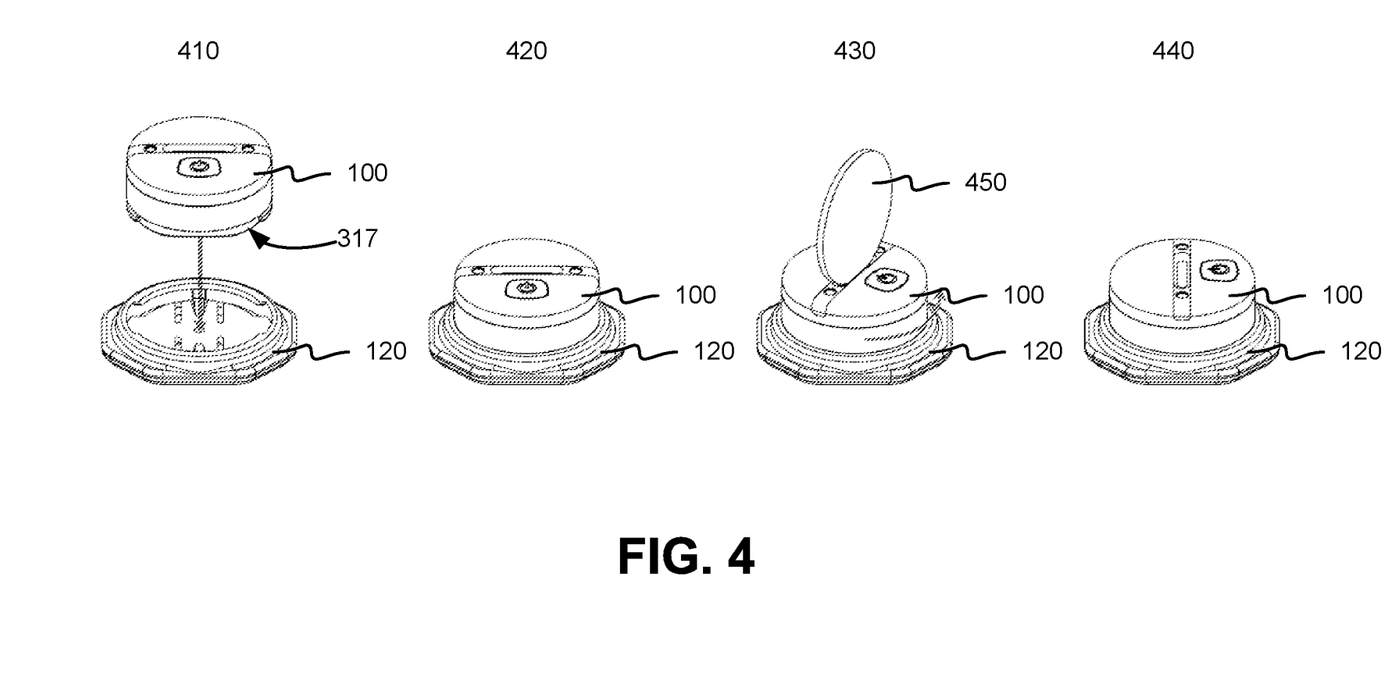
FIG. 4 illustrates a motion sensor device being inserted into and lock inside a sports instrument, according to one embodiment.

FIG. 4 illustrates a motion sensor device being inserted into and locked inside a sports instrument, according to one embodiment. In some embodiments, the motion sensor device 100 is attached to the sports instrument by inserting the motion sensor device inside an opening of the housing 120 and rotating the motion sensor device 100 (e.g., 90° counterclockwise) to lock the motion sensor device 100 into position. In some embodiments, a charger (e.g., charger shown in FIG. 7) may be used to rotate the motion sensor device to lock the motion sensor device 100 into position. In other embodiments, a coin may be used to lock the motion sensor device 100 into position. In the embodiment illustrated in FIG. 4, the motion sensor device 100 is designed so that the user could also use a coin 450 to lock the motion sensor device into position. If a user takes the motion sensor device out of the sports instrument, the user can use a substitution cap that has a similar shape and preferably also similar weight as the motion sensor device, so that the racket weight is not affected. In some embodiments, the bottom shell 317 is completely surrounded by the housing 120 when the motion sensor device 100 is locked into position. In other embodiments, the side portions of the bottom shell 317 are not surrounded by the housing 120.

Figure 5:
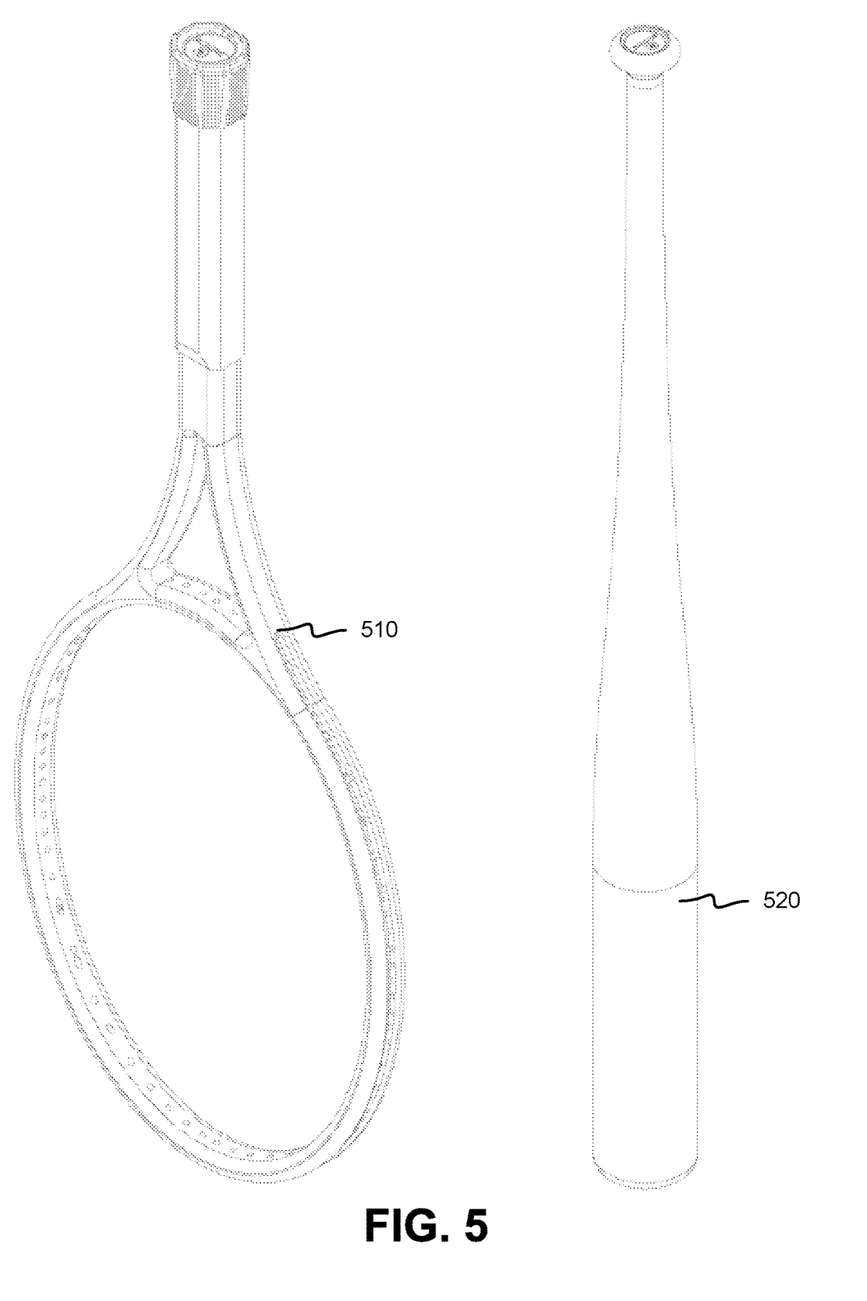
FIG. 5 illustrates motion sensor devices inserted into different sports instruments.
Figure 6:
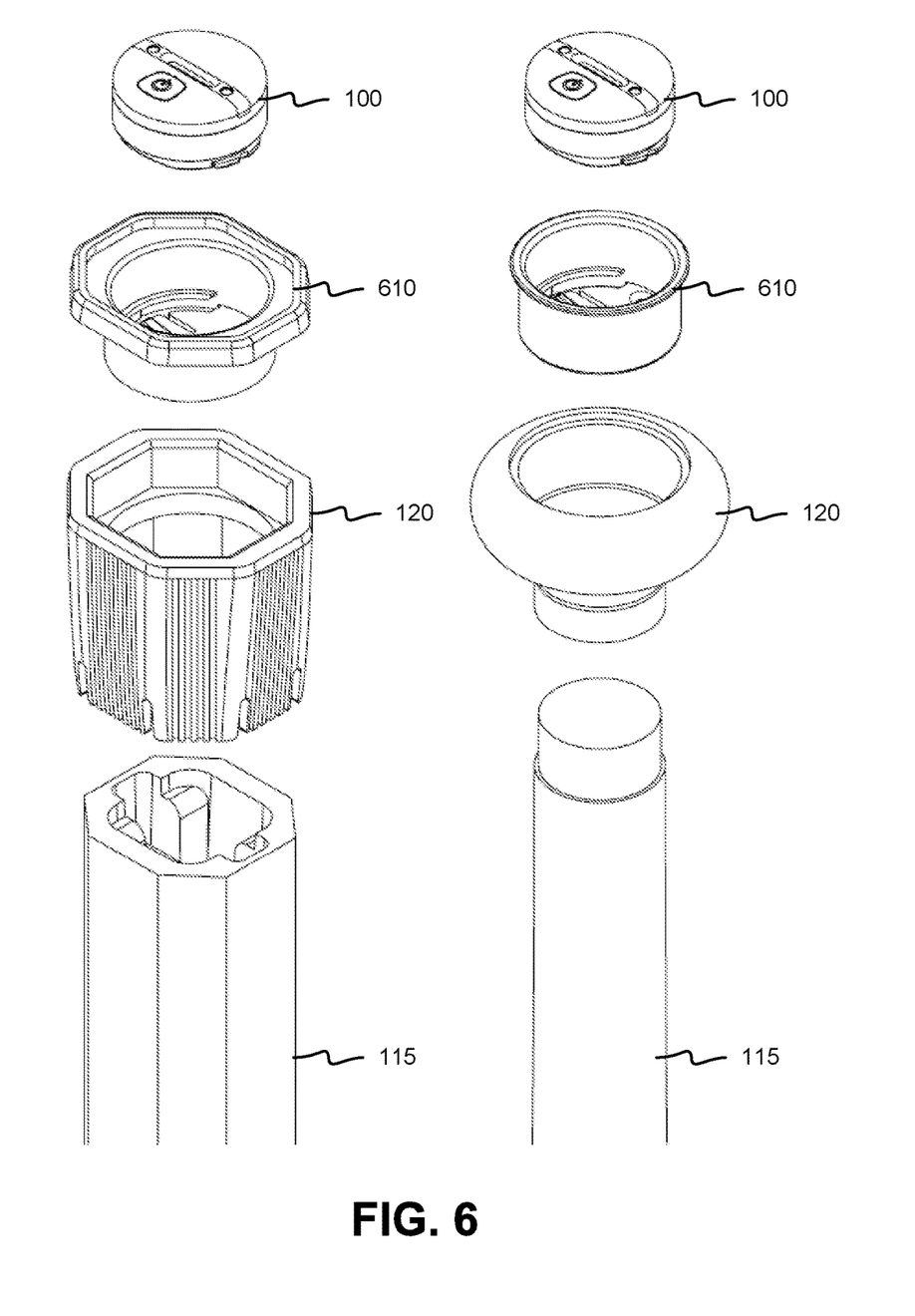
FIG. 6 illustrates exploded views of a motion sensor device and a sports instrument knob into which the motion sensor device is inserted, according to one embodiment.

FIG. 5 illustrates motion sensor devices being inserted into different sports instruments, according to one embodiment. FIG. 6 illustrates an exploded view of the motion sensor device 100 and a sports instrument knob into which the motion sensor device is inserted, according to one embodiment. In a first embodiment shown in FIG. 5, the motion sensor device 100 is inserted in a tennis racket 510. The motion sensor device 100 is inserted into a sensor housing 120 that is attached to the handle of the tennis racket 510. Referring to the left part of FIG. 6, the sensor housing 120 is molded to be attached to the handle 115 of the tennis racket. The sensor housing 120 further includes a cavity including a locking mechanism to house and lock the motion sensor device 100 inside the sensor housing 120. For example, as shown in FIG. 6, the sensor housing 120 is used to hold an insert component 610, which is used to lock the sensor 100 in position.

In a second embodiment shown in FIG. 5, the motion 100 is inserted into a baseball/softball bat 520. Referring to the right part of FIG. 6, the sensor housing 120 is molded to be attached to the bottom of the baseball/softball bat 520. In the embodiment of FIG. 6, the sensor housing 120 is shaped similar to the bottom of a baseball/softball bat. The sensor housing 120 further includes a cavity including a locking mechanism to house and lock the motion sensor device 100 inside the sensor housing 120.

Figure 7:
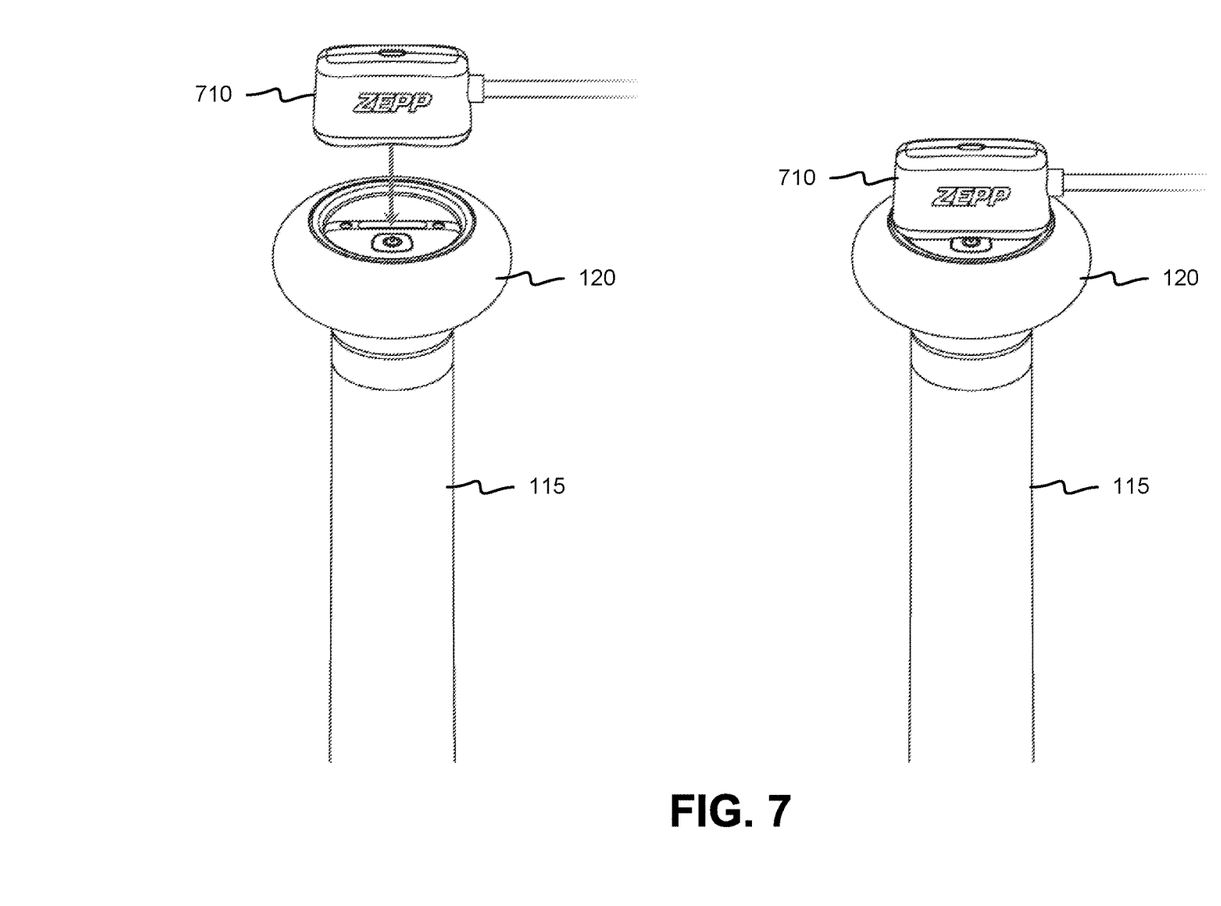
FIG. 7 illustrates a motion sensor device being charged, according to one embodiment.

FIG. 7 illustrates a motion sensor device being charged, according to one embodiment. The external charger 710 is aligned to the charging pins 305 by magnets 307. In some embodiments, the motion sensor device 100 may be charged while the motion sensor device 100 is attached to the sensor housing 120. In the example shown in FIG. 7, the external charger 710 is a proprietary charger designed specifically for the motion sensor device inserted into a sports instrument. Other types of non-proprietary external charger suitable for charging the motion sensor device inserted into a sports instrument can also be used. For example, a non-proprietary external charger with charging pins of the charger that can be correctly aligned to the charging pins of the motion sensor device to be charged is considered as a suitable charger to charge the motion sensor device.

Figure 8:
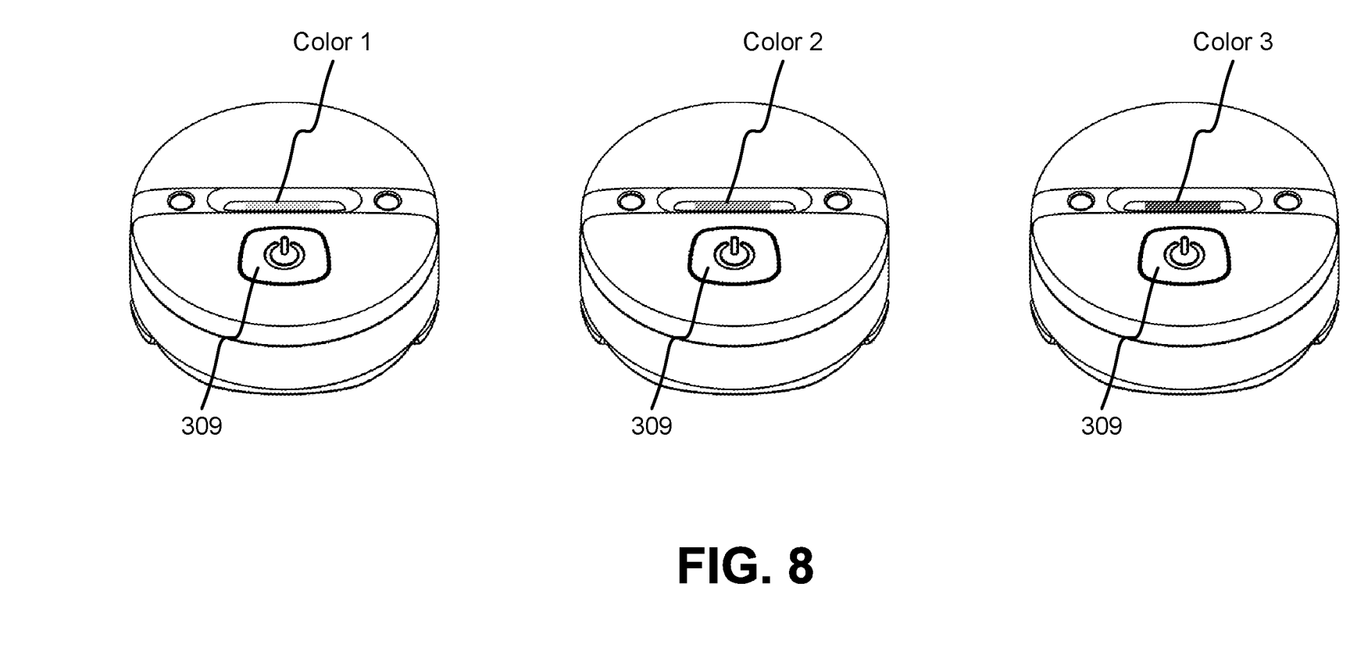
FIG. 8 illustrates examples of motion sensor device control and corresponding graphical indication, according to one embodiment.

FIG. 8 illustrates examples of motion sensor device control and corresponding graphical indication, according to one embodiment. In this example, the user interacts with the motion sensor device via the button 309 of the motion sensor device. For example, the user can use the button 309 to turn on/off the motion sensor device inserted inside a sports instrument, or trigger other commands, e.g., mark a swing. The motion sensor device communicates to the user via the multi-color LEDs, which are visible through the light shielding plate 303 as shown in FIG. 3. The motion sensor device could also be made touch-sensitive, in which case the user could communicate to the motion sensor device via touches. For example, while using the sports instrument having the motion sensor device inserted inside, a user can lunch commands to the motions sensor by tapping or double tapping the motion sensor device. The motion sensor device could also communicate wirelessly with the client device 130 as shown in FIG. 1B. The user can then control the motion sensor device using the client device 130.

In the example of FIG. 3, the LED of the motion sensor device shows three different colors. Different colors may represent various status of the motion sensor device. For instance, a first color (e.g., red) may represent that the motion sensor device's battery has a low amount of charge, a second color (e.g., green) may indicate that the motion sensor device is recording data, and a third color (e.g., yellow) may indicate that the motion sensor device is in standby mode.

Figure 9:
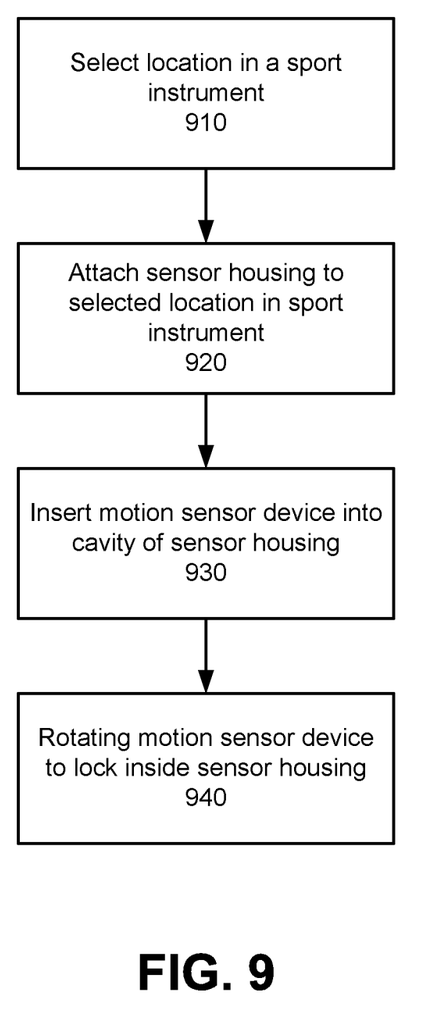
FIG. 9 illustrates a flowchart of a process for inserting and locking a motion sensor device into a sports instrument, according to one embodiment.

FIG. 9 illustrates a flowchart of a process for inserting and locking a motion sensor device into a sports instrument, according to one embodiment. Initially, a location in a sports instrument, e.g., a tennis racket, is selected 910 for inserting a motion sensor device. The sensor housing 120 (e.g., the sensor housing shown in FIG. 6) is attached 920 to the selected location in the sports instrument 110. For instance, the sensor housing 120 is attached to a bottom part of the handle of the sports instrument 110. The sensor housing 120 may be shaped to mimic the bottom portion of the handle of the sports instrument 110.

The motion sensor device 100 is inserted 930 into a cavity of the sensor housing 120. In some embodiments, the motion sensor device 100 completely fits inside the cavity of the sensor housing 120. In other embodiments, the motion sensor device 100 partially fits inside the cavity of the sensor housing 120. That is, portions of the motion sensor device 100 may be outside of the cavity of the sensor housing 120.

The motion sensor device 100 is rotated 940 to lock the motion sensor device 100 inside the sensor housing 120. In some embodiments, the motion sensor device 100 rotates 90° counterclockwise inside the cavity of the sensor housing 120. When the motion sensor device is rotated inside the cavity of the sensor housing 120, the locking mechanism of the motion sensor device 100 attaches the motion sensor device 100 to the sensor housing 120 and prevents the motion sensor device 100 from detaching from the sensor housing 120. To detach the motion sensor device 100 from the sensor housing 120, the motion sensor device is rotated in the opposite direction (e.g., 90° clockwise).

The motion sensor device is securely locked inside the sports instrument and is detachable for replacement. The insertion and locking of the motion sensor device in the sports instrument does not adversely affect a player's hold of the sports instrument. The motion sensor device inserted and locked inside the sports instrument is configured to detect motions associated with movements associated with the sports instrument. The motion parameters associated with the detected motion are collected through the embedded motion sensor and analyzed by a motion detection and recognition system for various applications, e.g., generating user friendly performance reports and performance improvement recommendations.

Figure 10:
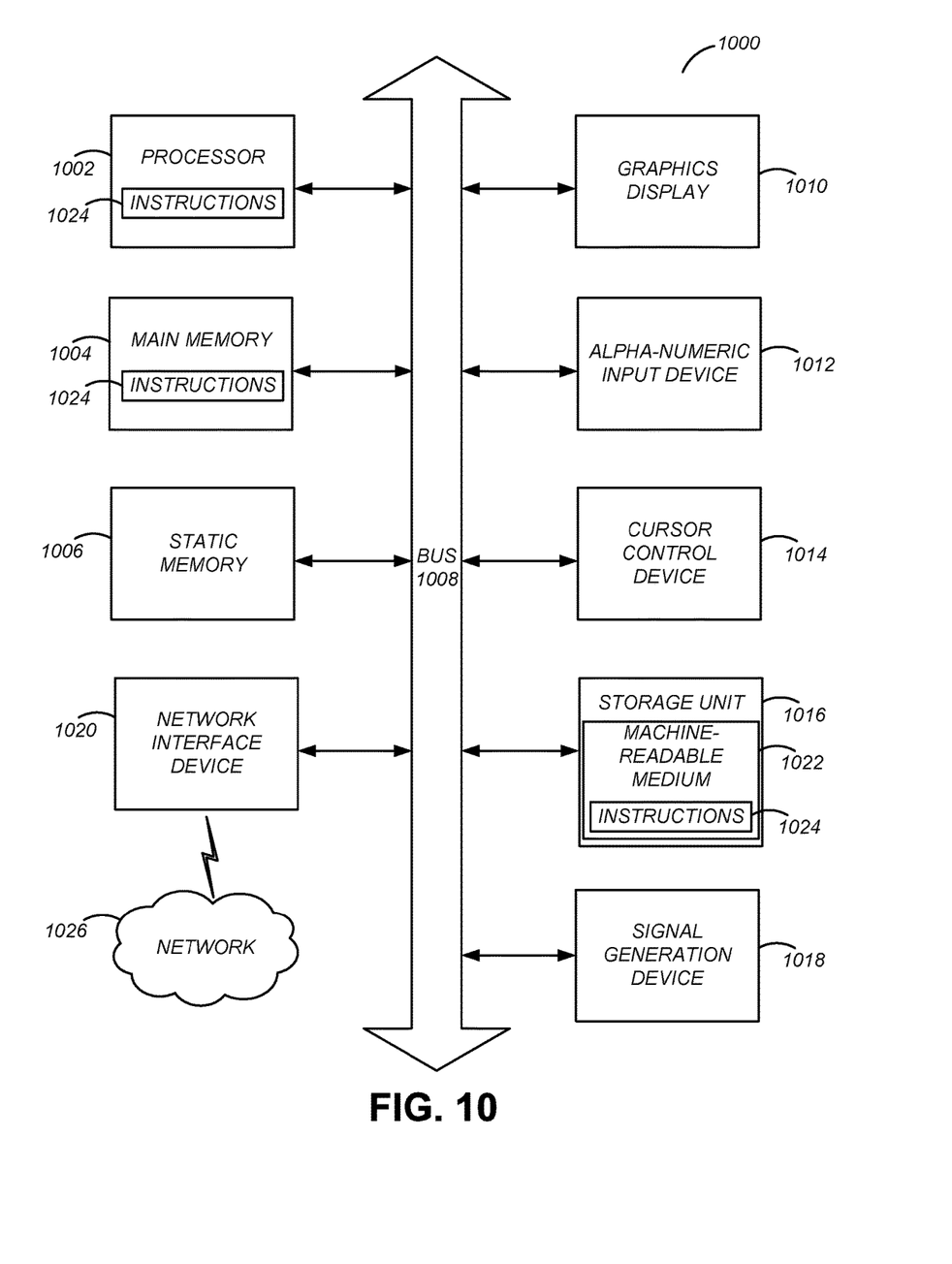
FIG. 10 illustrates one embodiment of components of an example machine able to read instructions from a machine-readable medium and execute them in a processor (or controller).

FIG. 10 is a block diagram illustrating components of an example machine, such as client device 130 of FIG. 1B, able to read instructions from a machine-readable medium and execute them in a processor (or controller). Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a personal digital assistant (PDA), a cellular telephone, a smartphone, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A device having a motion sensor to be inserted into a sports instrument, comprising:
   a motion sensor for detecting motion associated with the movement of the sports instrument, the motion sensor being shaped to be inserted into a sensor housing, the sensor housing being attached to a selected location inside the sports instrument;
   a rechargeable battery for powering the motion sensor, wherein a charger for charging the rechargeable battery has a plurality of charging pins, and wherein the plurality of charging pins are configured to provide electrical contact from the charger to the motion sensor;
   a cover for protecting the motion sensor inserted inside the sports instrument, the cover having a plurality of slots to host the plurality of charging pins;
   one or more magnets for orienting the plurality of charging pins of charger with the plurality of slots on the cover; and
   a locking mechanism attached to the sensor housing for locking the motion sensor inside the sensor housing, wherein the locking mechanism is configured to lock the motion sensor in position.

2. The device of claim 1, wherein each of the plurality of charging pins are surrounded by a magnet of the one or more magnets.

3. The device of claim 1, wherein the magnets repel the charger in response to one or more of the plurality of charging pins of the charger being incorrectly aligned with the plurality of slots on the cover.

4. The device of claim 1, wherein the magnets comprise:
   a first magnet oriented in a first direction, and a second magnet oriented in a second direction, opposite to the first direction, wherein the first magnet is disposed around a first charging pin and a second magnet is disposed around a second charging pin, and where in the first charging pin and the second charging pin are configured to connect the charger with the motion sensor.

5. The device of claim 4, wherein the first direction has a north pole of the first magnet facing upwards, and the second direction has a south pole of the second magnet facing upwards.

6. The motion sensor of claim 4, wherein:
   the charger comprises a first charger terminal, a second charger terminal, a first charger magnet and a second charger magnet;
   the first magnet is configured to attract the first charger magnet and the second magnet is configured to attract the second charger magnet in response to the first charging pin being aligned with the first charger terminal and the second charging pin being aligned with the second charger terminal; and
   the first magnet is configured to repel the second charger magnet and the second magnet is configured to repel the first charger magnet in response to the first charging pin being aligned with the second charger terminal and the second charging pin being aligned with the first charger terminal.

7. The device of claim 1, wherein the locking mechanism is configured to be rotated 90° to lock the motion sensor into position.

8. The device of claim 1, wherein the sports instrument is one of the following:
   a tennis racket, a badminton racket, a baseball bat, and a golf club.

9. The device of claim 1, further comprising:
   an antenna for wirelessly connecting the motion sensor to an external computing device.

10. The device of claim 9, wherein the motion sensor is configured to be controlled via the external computing device.

11. A method comprising:
   attaching a sensor housing to a handle of a sports instrument, the sensor housing including a cavity;
   inserting a motion sensor device into the cavity of the sensor housing, the motion sensor device including a cover having a plurality of slots to host one or more charging pins of a charger, the charging pins configured to provide electrical contact from the charger for charging a rechargeable battery for powering the motion sensor, and a locking mechanism attached to the sensor housing for locking the motion sensor device inside the sensor housing;

rotating the motion sensor to lock the motion sensor inside the sensor housing; and orienting, using one or more magnets, the charging pins of the charger with the plurality of slots of the cover.

12. The method of claim 11, wherein the sports instrument is one of the following:

a tennis racket, a badminton racket, a baseball bat, and a golf club.

13. The method of claim 11, further comprising:

rotating the locking mechanism 90° to lock the motion sensor device inside the sensor housing.

14. The method of claim 11, further comprising:

collecting motion data associated with the movement of the sports instrument at one or more sampling times, wherein the motion data comprises acceleration of the sports instrument and an angle of the sports instrument, relative to a three-dimensional geomagnetic coordinate system.

\* \* \* \* \*

UNITED STATES PATENT AND TRADEMARK OFFICE
CERTIFICATE OF CORRECTION

PATENT NO. : 9,724,578 B2  
APPLICATION NO. : 15/195756  
DATED : August 8, 2017  
INVENTOR(S) : Ke Zhao and Zheng Han Page 1 of 1

It is certified that error appears in the above-identified patent and that said Letters Patent is hereby corrected as shown below:

In the Claims

In Column 8, Line 2, Claim 1: "pins of charger" should read —pins of the charger—
In Column 8, Lines 21-22, Claim 4: "and where in the first charging pin" delete "where in" and add "wherein"

Signed and Sealed this  
Thirty-first Day of July, 2018

Andrei Iancu  
*Director of the United States Patent and Trademark Office*